United States Patent Office
3,088,490
Patented May 7, 1963

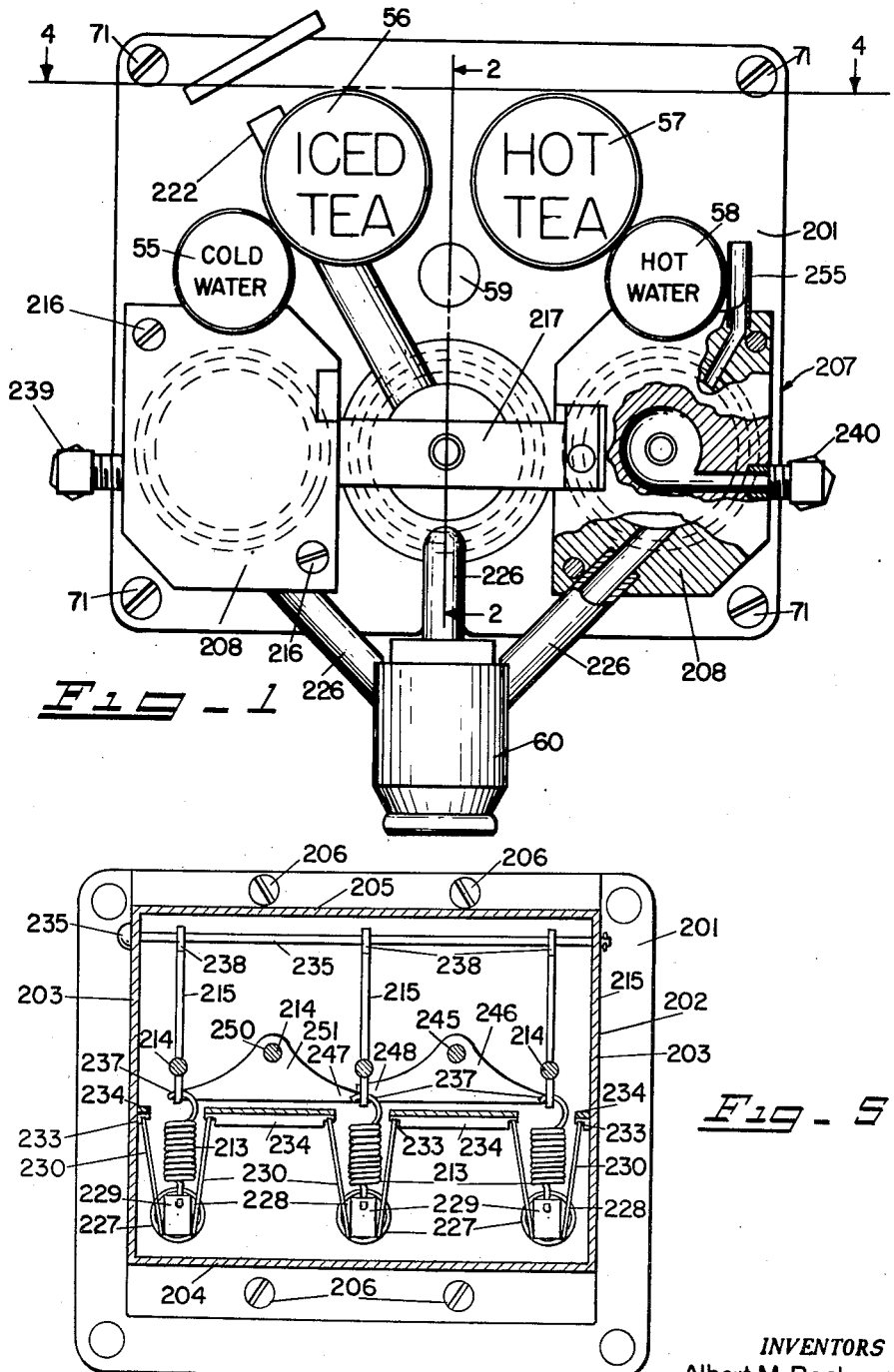

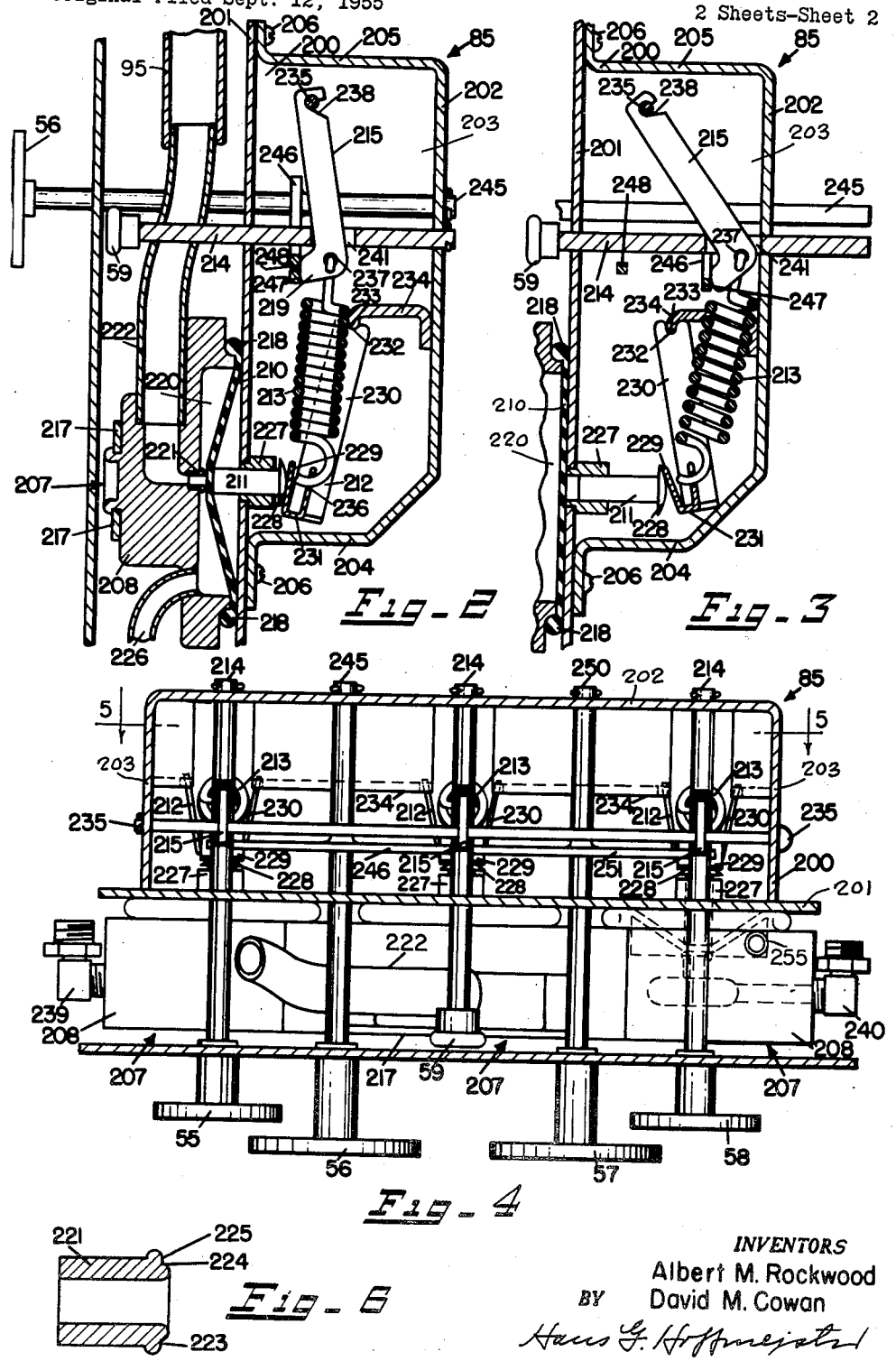

3,088,490
VALVE ASSEMBLY INCLUDING ACTUATING
MECHANISM THEREFOR
Albert M. Rockwood and David M. Cowan, Columbus, Ohio, assignors, by mesne assignments, to Tea Council of the United States of America, Inc., New York, N.Y., a corporation of New York
Original application Sept. 12, 1955, Ser. No. 533,788, now Patent No. 2,927,522, dated Mar. 8, 1960. Divided and this application Apr. 23, 1959, Ser. No. 810,523
9 Claims. (Cl. 137—637)

The present invention pertatins to a valve assembly including an actuating mechanism therefor and more particularly to a mechanism for substantially instantaneously moving one or more valve members between open and closed positions.

The subject application is a division of our copending parent application, Serial No. 533,788, filed September 12, 1955, entitled Tea-Making Apparatus and Method, which parent application matured into U.S. Patent No. 2,927,-522 on March 8, 1960.

A feature of this invention is an elastic diaphragm valve which is automatically operable between fully open or fully closed position substantially instantaneously irrespective of the intended speed of manipulation of the actuating mechanism.

Still another feature of this invention is an elastic diaphragm mixing valve which is capable of precisely mixing liquids proportionately under low operating fluid pressure and irrespective of the intended speed of manipulation of the operating mechanism.

Briefly, the valve of this invention comprises: a body having a chamber therein; a fluid inlet into the chamber and terminating in a valve seat; a fluid outlet that is in communication with the chamber; an elastic diaphragm positioned in the chamber opposite the seat; a plunger associated with the body for axial movement with respect to the chamber, and adapted to contact and elastically deform the diaphragm into engaging contact with the inlet valve seat; and snap action means operable alternately to move the plunger axially between a position against the diaphragm and a position releasing the diaphragm.

The mixing valve of this invention comprises a novel combination of a plurality of the above-described elastic diaphragm valve subassemblies in which the outlet flow from the valve assemblies converge and actuating means is provided to actuate the valves so that they open and close substantially simultaneously in various combinations.

It is an object of this invention to provide an elastic diaphragm valve operated by snap action means whereby slight movement of the actuating mechanism is sufficient to cause the valve to change from closed to open position under slight residual pressure and slight release of this residual pressure on the actuating mechanism is sufficient to allow the valve to change from open to closed position.

It is a further purpose of this invention to provide a manually operated valve wherein the movement of actuation is sufficiently great to prevent the accidental operation of the valve, and yet the operation of the valve mechanism itself is substantially instantaneous to reduce to an absolute minimum the period of time during which the valve is only partially opened or closed. It is still another purpose to provide a valve that may be inexpensively manufactured and yet will be capable of accurately controlling flow of fluid under slight pressure.

It is an object of this invention to provide a mixing valve wherein a plurality of valve subassemblies having elastic diaphragm aperture closure means is combined to simultaneously control the flow of a plurality of liquids to a common outlet by means of a single operating means.

It is another purpose to provide a mixing valve in which fluids under slight pressure may be mechanically mixed at a controlled uniform rate, and in which the opening and closing cycle is sufficiently swift that the proportions established for the mixing rate are substantially constant for the full period during which the mixing valve is open.

Other and further objects and advantages of the present invention will become apparent from the following description taken in connection with the accompanying drawings, in which:

FIG. 1 is a partially broken front view of a mixing valve according to this invention;

FIG. 2 is a broken right-side, sectional elevation view of the mixing valve of this invention, taken along the line 2—2 of FIG. 1;

FIG. 3 is a broken right-side, sectional elevation of the mixing valve of this invention, taken along the same line 2—2 of FIG. 1, showing the "over-center snap-action mechanism" in the opposite position from FIG. 2, and with the valve open;

FIG. 4 is a sectional top view of the mixing valve of this invention taken along the line 4—4 of FIG. 1;

FIG. 5 is a sectional elevation back view of the mixing valve of this invention taken along the line 5—5 of FIG. 4;

FIG. 6 is an enlarged sectional, elevational view of an inlet aperture member of a valve according to this invention.

In the tea machine of parent application referred to above, which utilizes a method of mixing tea concentrate with water to produce palatable tea of drinking strength, it is necessary that means be provided to mix the water and concentrate in controlled proportionate amounts.

Referring to the drawings, the mixing valve 85 is constructed in a two-piece frame or housing 200. The front frame member 201 forms a vertical front side of the housing 200. The rear frame member 202 forms a rear vertical side and includes formed ears 203 as well as bottom surface 204 and top surface 205. Front and rear frame members 201 and 202, respectively, are held in assembled engaging position by means of screws 206.

The frame 200 provides a common housing for a plurality of valve subassemblies designated generally as 207 that may be simultaneously operated in combination to mix the tea concentrate, and hot or color water, according to the wishes and manipulations of a user.

Each subassembly 207 comprises: a valve body 208, an elastic diaphragm 210, a plunger or valve member or element 211, a rocker member 212, resilient means such as a spring 213, a sliding separate operating or actuator means 214, and lever member 215.

In the valve combination shown in the drawings, wherein three valve subassemblies are disclosed, the valve bodies 208 of the right and left side subassemblies 207 are fastened against a diaphragm 210 by means of a plurality of screws 216. The center valve body 208 is held compressively against diaphragm 210 by means of a bridge member 217 which is locked at its ends behind projecting detents on the side valve body members 208. It will be seen that the center body member 208 is not the same from an external shape standpoint as the side body members 208. The difference in exterior shape between the side body members 208 and the center body member 208 evidence only that the exterior shape of the valve body members 208 is a matter of choice.

Each valve body 208 is provided with an annular chamber 220. An inlet aperture member 221 is centrally and axially disposed in the chamber 220 at one end thereof. Each valve body 208 is provided with a fluid inlet connection conduit 222 which is in communication with the inlet aperture member 221 at the inlet end. At the opposite end the inlet aperture member 221 is finished smooth with a stepped cross sectional shape to form a valve seat 225, as shown in FIG. 14. The step contour provides a smooth annular ridge 224. The ridge 224 is "raised" from a flat seat surface 223 by a small distance, such as .010 inch.

Each valve chamber 220 is provided with an outlet conduit 226. These conduits 116 converge in the spout 60.

In each valve subassembly 207, a bushing 227 is press-fitted in the front frame member 201 to support the plunger 211 in axial movement with respect to the chamber 220 and inlet aperture member 221. Each plunger 211 is provided with a rounded head 228 upon which a lower tab 229 of the rocker member 212 is adapted to engage.

The rocker member 212 is formed with oppositely disposed, substantially parallel leg portions 230 integrally connected by a bridge portion 231 of which the tab 229 is a part. At the end opposite to the tab 229, each leg 230 of the rocker 212 is provided with a notch 232. The notches 232 of each rocker 212 are adapted to pivot over an edge 233 of a pivot piece or fulcrum member 234 which is fastened in rear frame member 202 by spot welding or other means.

The rocker member 212 pivots forward and rearward between the position shown in FIG. 2 and the position shown in FIG. 3, pivoting on the pivot edge 233 under the influence of the resilient spring means 213.

The spring 213 is engaged in a hole 236 of the bridge 231 at one end and is engaged in a hole 237 of lever member 215. Lever member 215 is provided with a "foot" shaped portion 219 at its lower end.

Lever member 215 is pivotally supported on a shaft 235 which is transversely positioned in rear frame 202. The opposite ends of the shaft 235 are supported in holes in the side pieces 203. A means is provided on lever 215 whereby it may be easily disconnected from shaft 235 through an opening 238 in one side thereof. In the ordinary operating positions of lever 215, assembly is maintained with respect to shaft 235 by means of the tension in spring 213.

The sliding actuator means 214 is adapted to slide longitudinally in the supporting frame members 201 and 202.

Sliding actuator means 214 is provided with a slot 241 through which the lever 215 is inserted.

An operating knob, such as either the push button 59 or the push buttons 55 and 58 is connected at the front end of the sliding actuator means 214.

The valve subassembly 207 that is centrally positioned in the valve 85 is connected to the conduit 95 from a tea concentrate reservoir, not shown, by means of the fluid inlet tube 222. The valve subassembly 207 on the left is connected to a cold water supply conduit, not shown, by means of an elbow fitting 239. The valve subassembly 207 on the right side of the valve 85 is connected to a hot water supply conduit, not shown, by means of an elbow fitting 240. Thus, when the push button 55 is pushed in, the valve subassembly 207 of the left opens to allow cold water to flow into the spout 60. If the push button 59 is operated, the center valve subassembly 207 opens to allow tea concentrate to flow into the spout 60; and if the push button 58 is operated, the valve subassembly 207 on the right opens to allow hot water to flow through the valve into the spout 60.

Each valve subassembly 207 operates in the following manner: When a push button, such as push button 59, is pushed in, the forward edge of the slot 241 is moved toward the rear from the position shown in FIG. 2 toward the position shown in FIG. 3. In its movement to the rear the rear edge of the slot is carried to the rear as a part of actuator rod 214 which slides in the frame members 201 and 202.

The edge of the slot 241 engages and rotates the lever member 215 toward the rear on shaft 235. As the lever 215 is carried toward the rear, the upper end of the spring 213, which is fastened thereto, is moved from a position in front of pivot edge 233 to a position in the rear of pivot edge 233. Thus, the resilient tension force of this spring produces a counterclockwise movement on the rocker 212. This causes the rocker 212 to rock or pivot on the pivot edge 233 in a counterclockwise direction releasing pressure on the plunger 211 and allowing the diaphragm 210 to force the plunger 211 toward the rear. Movement of the diaphragm 210 and the plunger 211 toward the rear releases the diaphragm from engagement with the valve seat 225. This allows a fluid entering conduit 222 to flow through the inlet aperture member 221 into the chamber 220. The fluid flows from the chamber 220 out the conduit 226.

When the pressure is released from the push button 59 the stored energy of tension spring 213 causes the lever 215 to rotate clockwise and return toward the front carrying the actuator rod 214 and the upper end of the spring 213 forward also. This carries the resilient tension force of spring 213 "over center" toward the front and causes the tab 229 to press the plunger 221 against the diaphragm 210 forcing the diaphragm into engagement with the seat 225 which stops fluid flow in the valve subassembly 207.

In the closed position when the diaphragm 210 is pressed against the seat 225, the ridge 224 embeds itself slightly deeper in the diaphragm 210 than the surface 203. This provides an annular area of high pressure which serves to effectively stop flow from the valve, and at the same time cutting of the diaphragm by the ridge 224 is prevented.

Silicon rubber provides a good material for use in the diaphragm 210, since it provides the advantages of tastelessness and long life at high temperature. However, since this material is of relatively low elasticity, the diaphragm 210 is stretched into place and anchored by means of a rolled edge 218 impinging on the edge of the body 208, as shown in FIGS. 2 and 3. This rolled edge serves as a seal and prevents loss of the fluid when the valve body is removed from the front plate.

In the mixing valve 85 the various subassemblies 207 are combined to cooperatively operate the several valve subassemblies 207 simultaneously in pairs.

As shown in FIGS. 1, 4 and 5, a multiple operating shaft 245 having a push button 56 rigidly fastened at one end thereof is slidably mounted in the frame members 201 and 202 at a position above and between the subassemblies 207 operated by push buttons 55 and 59. A sear plate 246 is rigidly fastened to the shaft 245 at right angles. The sear plate 246 is generally triangular in shape, and the lower angle portions respectively engage behind the foot portions 219 at ears 247 and 248 of the valve subassemblies 207 on either side thereof.

In the operation of the subject valve assembly, when the iced tea push button 56 is operated by pushing in thereon, the sear plate 246 is moved to the rear with the shaft 245, and the ears 248 and 247 engage the levers 215, forcing them simultaneously to the rear. This causes the valve subassembly 207 controlling cold water and tea concentrate, to open. Cold water and tea concentrate flow simultaneously into the spout 60 and into a suitable container, such as an iced tea glass, not shown.

In a similar fashion the hot tea push button 57 is fastened to a slidable shaft 250 which is provided with a sear plate 251 rigidly fastened thereto and adapted to engage levers 215 of the valve subassemblies 207 that are operated by push buttons 59 and 58. Thus, operation of the push button 57 by pushing in thereon forces the shaft 250 rearward. Sear plate 251 engages the levers 215 and carries them to the rear. This allows tea concentrate and hot water to flow simultaneously into the spout 60 and from there into a container, not shown.

When the several valve subassemblies 207 are operated simultaneously by means of "hot-tea" push button 57 or "iced-tea" push button 56, the springs 213 serve to exert pressure toward the front and close the valve 85 whenever pressure is released from the push buttons 56 and 57.

It has been found preferable to control the proportioning of tea concentrate to water within a range of six percent so that optimum or acceptable tea will be consistently provided by the machine 25. The mixing valve of this invention provides a reliable and accurate metering means within these limits prescribed. It will be seen that because of the snap-action movement of the valve 85, any tendencies by an operator to operate the valve in a half-open or intermediate position is greatly minimized. When the valve is pushed in, the force necessary to provide movement to the rear is drastically reduced as the spring 213 goes "over center." This automatically acts as a boost in the inward pressure, and the valve almost instantaneously snaps open providing a full flow rate. Conversely, when pressure is being released from the push button there is a boost in forward force when the spring 213 goes "over center," and the valve snaps closed substantially instantaneously.

It has been found that the preparation of tea by means of mixing a concentrate with hot water at the time the liquids are entering or on the way into a container such as a cup has produced a new problem. This new problem is that a great number of minute air bubbles are formed in the cup of hot tea during the period when the water and concentrate are entering the cup and shortly thereafter. These minute air bubbles are of sufficient quantity to give the tea a streaked appearance on its upper surface. This streaked appearance is objectionable and the subject of complaint by restaurant customers. These small bubbles which are caused by the admission of hot water from the tank 75 disappear in a matter of one or two minutes and the tea again appears clear. However, in order to prevent the formation of these bubbles for this short period of time, it has been found that the tea may be deaerated prior to the time that the hot water is mixed with the concentrate. Means to deaerate this hot water may be a spray method or other means of increasing the surface area of the hot water stream before it mixes with the concentrate.

As shown on the hot water valve 207 in FIGS. 1, 2, 3, and 4, the water entering the body 208 is directed tangentially to the edge of the aperture member 221 so that the hot water passes through the aperture 221 with a swirling pattern and enters the chamber 220 in a spray. The liberated air passes out through a stand pipe 255 in communication with the chamber 220.

While it is envisioned that suitable electric valves, circuiting and switch buttons could be used to provide the substantially instantaneous opening and closing required for proper metering in a mixing valve for the tea machine of this invention, the mechanical-action of valve 85 is especially suitable and preferred because it provides the same precise metering action at considerably less expense and at considerably greater construction simplicity and greater operational reliability.

What is claimed is:

1. A mixing valve comprising: a frame; a plurality of body members supported on said frame; a chamber in each of said body members; a fluid inlet into each of said chambers, terminating in a valve seat; a fluid outlet from each of said chambers converging into one mixing valve outlet; an elastic diaphragm in each of said chambers opposite said valve seat; a plunger supported in said frame in each of said chambers for axial movement with respect to said chamber and positioned opposite said diaphragm to contact and elastically deform said diaphragm into engaging contact with one of said valve seats; a plurality of separate snap-action means, each independently operable to move one of said plungers axially against one of said diaphragms; and a shaft member supported in said frame moveable to engage a plurality of snap-action means simultaneously.

2. In a dispensing machine, a valve for mixing a tea concentrate and water to produce a palatable tea comprising: a valve subassembly connected to a source of each of said palatable tea ingredients, each subassembly supported in a frame and adapted to be closed by pressure on a plunger member and opened by release of said pressure; a rocker member for each of said valve subassemblies, pivotally supported on said frame and positioned to engage one of said plungers; a lever member pivotally supported in said frame; a resilient means fastened to each of said rocker members and to a corresponding lever member, to urge said rocker member against a plunger member when said lever member is in one position and to release said plunger when said lever member is in a second position; and a shaft member slideably supported in said frame, engageable with a plurality of said lever members to move said lever members from said first position to said second position substantially simultaneously.

3. In a mixing valve, a frame; a plurality of body members supported on said frame, each of said body members having a chamber and a valve seat opening into said chamber; an elastic diaphragm in each of said chambers in opposed relation to its respective valve seat; a plunger supported in said frame in association with each of said chambers for movement toward and away from its respective seat and being positioned in opposed relation to its respective diaphragm for contacting and elastically deforming the associated diaphragm into fluid-tight engagement with its respective valve seat; a plurality of snap-action means each independently operable for moving its associated plunger against its corresponding diaphragm; and a shaft supported in said frame movable for engagement with a plurality of snap-action means simultaneously.

4. In a valve mechanism; a frame; a plurality of body members supported in the frame and individually provided with chambers and valve seats opening into their respective chambers, said valve seats individually circumscribing axes therefor; elastic diaphragms individually positioned in said chambers in opposed relation to their respective valve seats; plungers supported in said frame individually associated with said chambers on the opposite sides of their respective diaphragms from the seats for movement axially of their respective seats and for contacting and elastically deforming said diaphragms into fluid-tight engagement with their respective valve seats; a plurality of snap-action means respectively associated with said plungers for independently moving their respective plungers against their corresponding diaphragms; and means supported in said frame for engagement with a plurality of said snap-action means for concurrently moving selected ones of said plungers against their corresponding diaphragms.

5. In a dispensing machine including a frame, a valve for mixing a plurality of fluid ingredients to produce a composite fluid, comprising plungers mounted in the frame; and valve subassemblies adapted to be connected to sources of said fluid ingredients and individually associated with the plungers, each subassembly being supported in said frame and adapted to be closed by pressure on its associated plunger and opened by release of said pressure, each subassembly including a rocker pivotally supported in said frame and positioned to engage its associated plunger, a lever pivotally supported in said frame, resilient means fastened to each rocker and to its corresponding lever for urging such rocker against its respective plunger when said lever is in one position, and for releasing its plunger when its lever is in a second position, and a shaft slidably supported in said frame and engageable with a plurality of said levers to move said levers substantially simultaneously from said first positions thereof to said second positions.

6. In a valve assembly, a frame, a plurality of valve members mounted in said frame for movement between open and closed positions, a plurality of snap-acting means mounted in said frame and individually associated with said valve members for movement between valve actuating positions engaging and urging their respective valve members to closed positions and retracted positions permitting movement of said valve members to their open positions, a multiple operating member mounted in said frame for movement between a first position simultaneously engaging a plurality of said snap-acting means for moving said snap-acting means into their retracted positions thereby simultaneously permitting movement of said valve members into open positions and a second position permitting return of said snap-acting means to their actuating positions, and separate valve operating members mounted in said frame for movement into first positions individually engaging said snap-acting means for moving said snap-acting means from their actuating positions to their retracted positions independently of each other and of said multiple operating member and second positions permitting return of their respective snap-acting means to their actuating positions.

7. In a valve mechanism; a frame; a plurality of body members supported in said frame and individually provided with chambers and valve seats opening into their respective chambers, said valve seats individually circumscribing axes therefor; valve closures individually positioned in said chambers in opposed relation to their respective valve seats, said closures including means yieldably urging said closures into open positions spaced away from their respective seats; plungers supported in said frame and individually associated with said chambers on the opposite sides of their respective closures from said seats for movement axially of their respective seats and for contacting and moving said closures into fluid-tight engagement with their respective seats; a plurality of snap-action means respectively associated with said plungers for independently moving their respective plungers against corresponding closures; and means supported in said frame for engagement with a plurality of said snap-action means for concurrently moving selected plungers against their corresponding closures.

8. In a valve mechanism; a plurality of valve seats individually circumscribing axes therefor; elastic diaphragms individually mounted in opposed relation to said valve seats; plungers individually associated with said diaphragms and mounted on the opposite sides of their respective diaphragms from said seats for movement axially of their respective seats into contact with their associated diaphragms for moving said diaphragms into fluid-tight engagement with their respective seats; snap-actions means respectively associated with said plungers for independently moving their respective plungers against their corresponding diaphragms; and means supported for engagement with the snap-action means associated with a plurality of said plungers for concurrently moving such plungers against their corresponding diaphragms.

9. In a valve assembly, a frame, a plurality of valve members mounted in said frame for movement between open and closed positions, a plurality of spring-urged means mounted in said frame and individually associated with said valve members for movement between valve actuating positions engaging and urging their respective valve members to closed positions and retracted positions permitting movement of said valve members to their open positions, a multiple operating member mounted in said frame for movement between a first position simultaneously engaging a plurality of said spring-urging means for moving said spring-urging means into their retracted positions thereby simultaneously permitting movement of said valve members into open positions and a second position permitting return of said spring-urging means to their actuating positions, and separate valve operating members mounted in said frame for movement into first positions individually engaging said spring-urging means for moving said spring-urging means from their actuating positions to their retracted positions independently of each other and of said multiple operating member and second positions permitting return of their respective spring-urging means to their actuating positions.

References Cited in the file of this patent

UNITED STATES PATENTS

| | | |
|---|---|---|
| 1,558,276 | Peterson | Oct. 20, 1925 |
| 1,603,005 | Flam | Oct. 12, 1926 |
| 2,276,433 | Iturman | Mar. 17, 1942 |
| 2,469,189 | Williams | May 3, 1949 |
| 2,573,888 | Benjamin | Nov. 6, 1951 |
| 2,661,402 | Balch | Dec. 1, 1953 |
| 2,708,371 | Pashby | May 17, 1955 |
| 2,708,849 | Steenbergh | May 24, 1955 |
| 2,733,042 | Culbertson | Jan. 31, 1956 |
| 2,743,738 | Johnson | May 1, 1956 |
| 2,822,891 | Wallace | Feb. 11, 1958 |
| 2,855,958 | Welty | Oct. 14, 1958 |
| 2,875,977 | Stone | Mar. 3, 1959 |
| 2,980,140 | McMillan | Apr. 18, 1961 |

FOREIGN PATENTS

| | | |
|---|---|---|
| 927,488 | Germany | of 1955 |
| 978,632 | France | of 1950 |